(12) United States Patent
DeAngelis

(10) Patent No.: US 6,487,918 B1
(45) Date of Patent: Dec. 3, 2002

(54) AIRFLOW SENSOR FOR AVERAGING TOTAL PRESSURE

(75) Inventor: Darryl W. DeAngelis, Northampton, MA (US)

(73) Assignee: Mestek, Inc., Westfield, MA (US)

( * ) Notice: Subject to any disclaimer, the term of this patent is extended or adjusted under 35 U.S.C. 154(b) by 21 days.

(21) Appl. No.: 09/747,037

(22) Filed: Dec. 22, 2000

(51) Int. Cl.[7] .................................................. G01F 1/46
(52) U.S. Cl. .................................................. 73/861.66
(58) Field of Search ........................ 73/861.65, 861.66, 73/202

(56) References Cited

U.S. PATENT DOCUMENTS

| | | |
|---|---|---|
| 3,355,946 A | 12/1967 | Lazell |
| 3,768,308 A | 10/1973 | Neradka |
| 3,981,192 A | 9/1976 | Bauder |
| 3,981,193 A | 9/1976 | Goulet |
| 4,170,134 A | 10/1979 | Nathan |
| 4,481,829 A | 11/1984 | Shortridge |
| 4,545,260 A | 10/1985 | Benton et al. |
| 4,602,514 A * | 7/1986 | Kurrle et al. ................ 73/202 |
| 4,677,858 A | 7/1987 | Ohnhaus |
| 4,703,661 A | 11/1987 | Evers |
| 4,768,386 A | 9/1988 | Taddeo |
| 4,823,615 A | 4/1989 | Taha |
| 4,838,087 A | 6/1989 | Nishiyama et al. |
| 5,063,962 A | 11/1991 | Fahrni et al. |
| 5,233,865 A | 8/1993 | Rossow |
| 5,481,925 A | 1/1996 | Woodbury |
| 5,616,861 A * | 4/1997 | Hagen ..................... 73/170.02 |
| 5,628,565 A * | 5/1997 | Hagen et al. ............... 374/138 |

* cited by examiner

*Primary Examiner*—Harshad Patel
(74) *Attorney, Agent, or Firm*—McCormick, Paulding & Huber LLP

(57) ABSTRACT

A flow sensor for compressible fluid comprising a central hub having a total pressure chamber and a static pressure chamber disposed therein. A pair of wings extend radially outward from opposing sides of the total pressure chamber. The wings include a plurality of radially spaced holes oriented to generally face an upstream direction and an internal wing passageway connecting the spaced holes to the total pressure chamber. The sensor also includes a static tube having a tube wall extending outward from the static pressure chamber from a first attached end to a second distal closed end. A generally upstream facing hole and a generally downstream facing hole are disposed on opposing sides of the tube wall intermediate the first and second ends to define a fluid flow passage therethrough. An internal tube passageway connects the flow passage to the static pressure chamber.

18 Claims, 3 Drawing Sheets

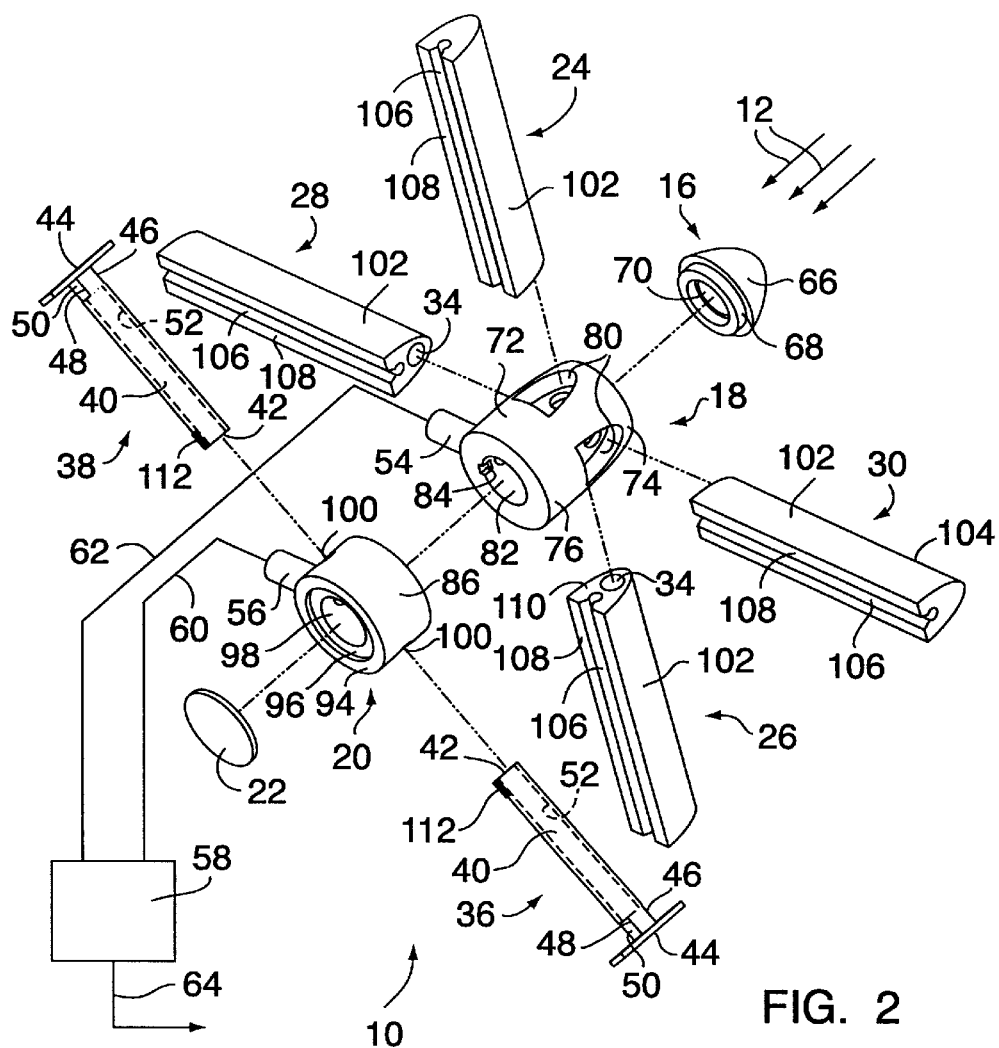
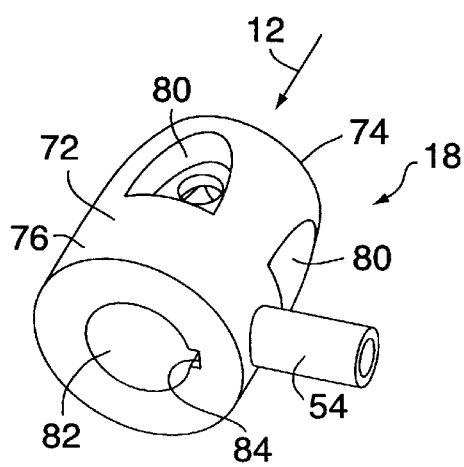
FIG. 4
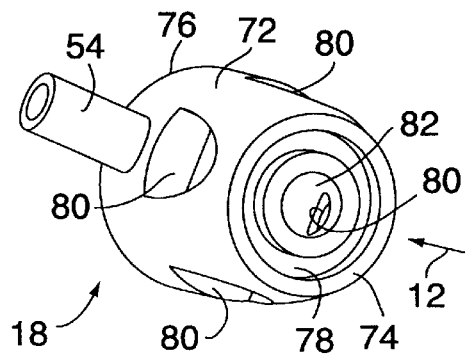
FIG. 5

AIRFLOW SENSOR FOR AVERAGING TOTAL PRESSURE

FIELD OF THE INVENTION

The present invention relates to air control and distribution devices used in commercial air distribution systems. More specifically, the present invention relates to a flow sensor for a compressible fluid, such as air, having a fluid flow, wherein the flow sensor samples and averages the total pressure profile over the cross section of a duct.

BACKGROUND OF THE INVENTION

Airflow sensors are used to measure the quantity of air flowing in the ducting of air-conditioning systems to provide control signals to an air terminal. Air terminals are devices of an air-conditioning system that modulate the volume of air delivered to a conditioned space, e.g., of a building, in response to a given thermal load. Examples of various types of air terminals include: variable air volume (VAV) units, bypass terminals, integral diffuser terminals and dual duct terminals.

As the air to be measured flows through the ducting from an upstream direction toward a downstream direction, pressure is generated in all directions in the form of a static pressure. Moreover, on the duct walls perpendicular to the direction of flow, the static pressure is the primary component of pressure. In addition, there is an impact pressure (velocity pressure) on anything that is facing upstream of the direction of flow. The combination of these two forces is called total pressure. Thus, the force on any object in the airflow path that faces the upstream direction has this total pressure acting on it. To derive airflow as a quantity over rate of time, e.g., cubic feet per minute (CFM), from the pressures measured in a duct system, one must subtract the measured static pressure from the measured total pressure to obtain the velocity pressure.

Prior art pitot tube type instruments have been used to perform this task. However, the use of a single pitot tube in the air stream does not provide accurate results. This is because the total pressure varies at different points along the cross section of a duct system, due primarily to frictional drag forces of the air against the duct walls.

Problematically, the traditional pitot tube design provides no amplification of the differential between the static pressure and the total pressure, which is often very small. This is especially problematic in cases of low velocity pressures that are inherent to low CFM, such as when a VAV unit is operating at its minimum rated flow. Consequently, many industrial pressure transducers have difficulty reacting to changes in velocity under low flow conditions when used with such prior art flow meters utilizing a traditional pitot tube design.

Other prior art airflow sensors have been developed which require the averaging of multiple measurements over the cross section of the duct to determine total pressure. One such prior art airflow sensor is disclosed in U.S. Pat. No. 5,481,925 to Woodbury, filed on Sep. 9, 1994 (hereinafter "Woodbury").

Woodbury describes an airflow sensor adapted to be mounted within a flow conduit. The airflow sensor includes a streamlined central hub, at least two pair of upstream airflow sensing tubes and a corresponding number of downstream airflow sensing tubes. The central hub is of air foil shape having an upstream region smoothly transitioning to a downstream region. The upstream airflow sensing tubes are diametrically opposed and extend radially outwardly from the central hub. Each of the upstream airflow sensing tubes including a plurality of radially spaced holes. The holes fluidly connect regions exterior to the tube to an internal flow passage thereof. The holes are spaced from one another such that each hole receives airflow from an equal concentric cross-sectional area of a flow conduit and face upstream to sample the varying total pressure profile along the conduit. The upstream tubes also include a streamlined attachment member for attaching the tubes to an inner wall of the flow conduit. The downstream airflow sensing tubes extend radially outwardly from the central hub a distance shorter than a distance of radial extension of the upstream airflow sensing tubes. Each downstream airflow sensing tube has a single inlet at an end thereof and is circumferentially spaced from a respective adjacent upstream airflow sensing tube in order to measure static pressure within the duct.

However the plurality of upstream facing holes of Woodbury are spaced such that each hole receives airflow from an equal concentric cross sectional area of flow in the duct. This spacing pattern fails to account for the frictional losses at the duct wall. This error can be especially problematic in rectangular ducts.

Moreover, noise is often a problem in prior art flow sensors. Excessive noise levels generated by a flow sensor under normal operating conditions can be a critical factor in a potential customer's decision to buy. The noise generation issue is of such importance that the Air-Conditioning & Refrigeration Institute (ARI), one of the primary standard making bodies of the refrigeration industry, has developed Standard 880 (herein incorporated by reference). Standard 880 measures and publishes noise levels for air terminals, of which airflow sensors are very often used therein. In order to enhance performance ratings during the standardized test conditions imposed by ARI 880, many airflow sensors, e.g., Woodbury, have a streamlined shape. However, certain streamlined shapes perform better than others for different types of equipment. It is therefore important for a manufacturer to determine the best streamline shape required to optimize noise level performance of its equipment.

Accordingly, there is a need for an improved flow sensor for measuring the flow of a compressible fluid, such as air, in a duct.

SUMMARY OF THE INVENTION

The present invention offers advantages and alternatives over the prior art by providing a flow sensor for a compressible fluid, which utilizes radially spaced holes to average the total pressure profile of the fluid flow in a duct. Additionally, the flow sensor utilizes a static tube having a closed distal end and a flow passage therethrough to amplify the differential between the static pressure and the total pressure. Moreover, the flow sensor has a streamlined shape to reduce operating noise levels and minimize pressure drop across the flow sensor.

These and other advantages are accomplished in an exemplary embodiment of the invention by providing a flow sensor for compressible fluid having a fluid flow from an upstream direction toward a downstream direction. The flow sensor comprises a smoothly contoured central hub having a total pressure chamber and a static pressure chamber disposed therein. A pair of wings extends radially outward from opposing sides of the total pressure chamber of the hub. The wings include a plurality of radially spaced holes oriented to generally face the upstream direction and an internal wing passageway connecting the spaced holes to the total pressure chamber. The flow sensor also includes a static tube having a tube wall extending radially outward from the static pressure chamber of the hub from a first attached end to a second distal closed end. A generally upstream facing hole and a generally downstream facing hole are disposed on opposing sides of the tube wall intermediate the first and second ends to define a fluid flow passage therethrough. An internal tube passageway connects the flow passage to the static pressure chamber.

In an alternative embodiment of the invention, the flow passage of the static tube of the flow sensor is shaped to provide a vortex effect which reduces static pressure of the fluid within the static pressure chamber relative to static pressure of the fluid external to the static chamber. By reducing the static pressure, the differential between the static pressure and total pressure is effectively amplified.

In another embodiment of the invention the radially spaced holes on the wings of the flow sensor are substantially spaced per the Log-Tchebycheff rule. By spacing the holes as such, losses due to frictional forces between the walls of a duct and the fluid flow are taken into account.

In another alternative embodiment of the invention the wings and hub of the flow sensor have a substantially elliptical shape to reduce noise levels generated by the flow sensor and minimize pressure drop across the flow sensor.

BRIEF DESCRIPTION OF THE DRAWINGS

FIG. 2 is an exploded view of the airflow sensor of FIG. 1

FIG. 4 is perspective view of the total pressure chamber of the airflow sensor of FIG. 1;

FIG. 5 is perspective view of the total pressure chamber of the airflow sensor of FIG. 1;

DETAILED DESCRIPTION

Figure 1:
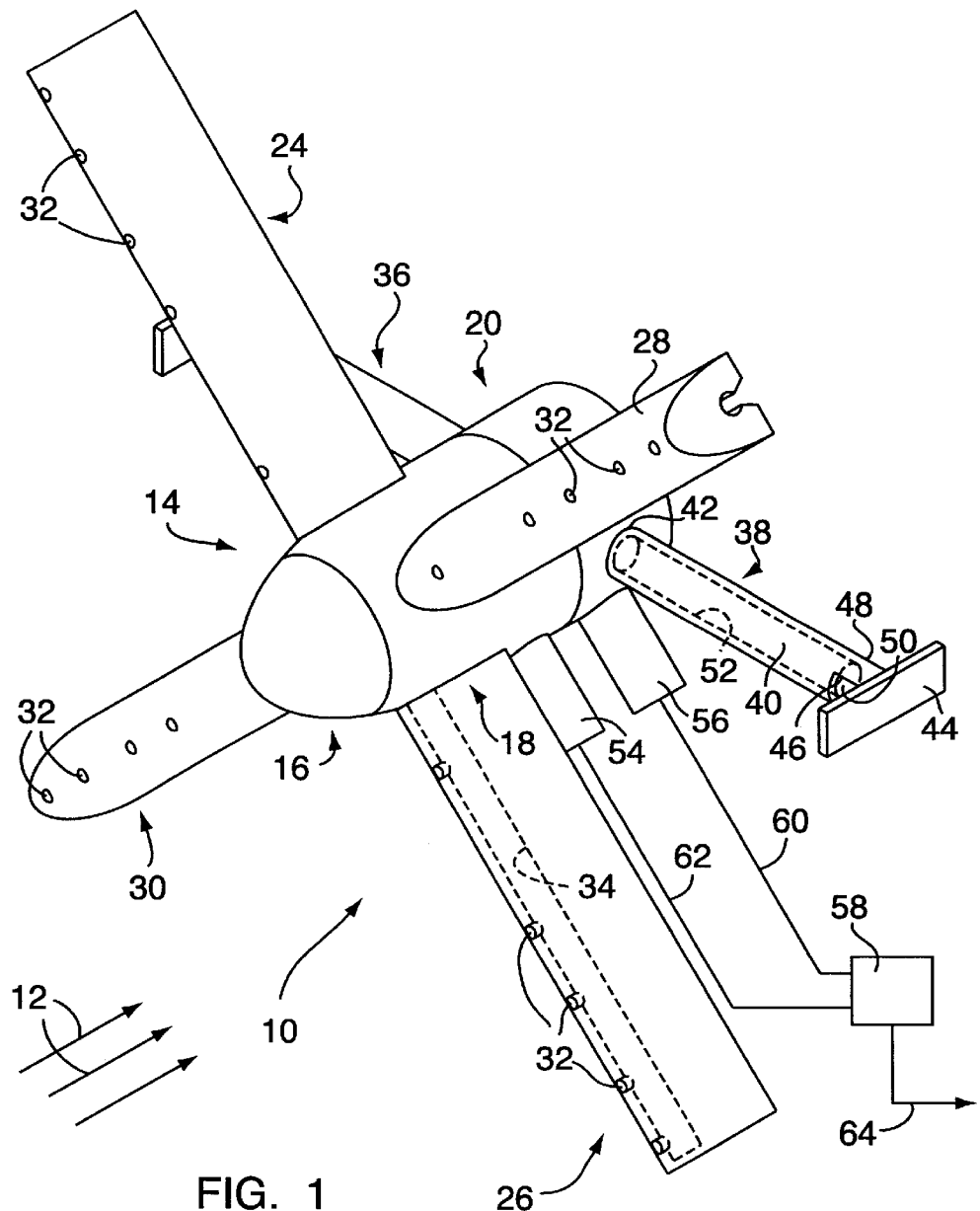
FIG. 1 is a perspective view of an exemplary embodiment of an airflow sensor in accordance with the present invention.

Referring to FIGS. 1 and 2, perspective and exploded views of an exemplary embodiment of an airflow sensor in accordance with the present invention are shown generally at 10. The airflow sensor 10 is adapted to be mounted in a duct (not shown) of an air control and distribution system, e.g., an air conditioning or heating system. The air moving through the duct has a fluid flow, represented by arrows 12, from an upstream direction toward a downstream direction. The airflow sensor 10 includes a smoothly contoured central hub 14 having a generally bullet shaped nose 16 facing the upstream direction. The hub 14 also includes a total pressure chamber 18 and a static pressure chamber 20 disposed thereon. The downstream end of the hub 14 includes a static chamber cap 22 to enclose the static pressure chamber 20.

As used herein, and in the claims which follow, any relative terms, e.g., upstream, downstream and their derivatives, are used with the flow sensor 10 in question assumed to be oriented as shown in FIG. 1, i.e., with its nose 16 facing the upstream direction toward the heads of the arrows 12.

A first pair of wings 24 and 26 and a second pair of wings 28 and 30 extend radially outward from opposing sides of the total pressure chamber 18 of the hub 14. The wings 24, 26, 28 and 30 are offset by substantially 90 degrees to cover each quadrant of the duct. The wings 24, 26, 28 and 30 include a plurality of radially spaced holes 32 oriented to generally face the upstream direction of the airflow 12 and an internal wing passageway 34 connecting the spaced holes 32 to the total pressure chamber 18.

The flow sensor 10 also includes a pair of static tubes 36 and 38. Each static tube 36, 38 has a tube wall 40 extending radially outward from opposing sides of the static pressure chamber 20 of the hub 14 from a first attached end 42 to a second distal closed end 44. A generally upstream facing hole 46 and a generally downstream facing hole 48 are disposed on opposing sides of the tube wall 40 to define a fluid flow passage 50 therethrough proximate the second distal end 44. An internal tube passageway 52 connects the flow passage 50 to the static pressure chamber 20. As will be discussed in greater detail hereinafter, the flow passages 50 of the static tubes 36 and 38 are advantageously shaped to provide a vortex effect, which reduces static pressure of the air within the static pressure chamber 20 relative to static pressure of the air external to the static pressure chamber.

During operation, the total pressure of the airflow is sampled by the radially spaced holes 32 along the wings 24, 26, 28, 30 of the flow sensor 10 and averaged in the total pressure chamber 18. The static pressure of the airflow is sampled at the fluid flow passage 50 of the static tubes 36, 38 and averaged in the static pressure chamber 20. The total pressure chamber 18 includes a total pressure port 54 and the static pressure chamber 20 includes a static pressure port 56, both of which are in fluid communication with controller 58 through fluid lines 60 and 62 respectively. The controller reacts to the difference of the static pressure and the total pressure and generates a resultant signal 64 indicative of airflow rate.

Though the flow sensor 10 in this embodiment is described as being used to measure the rate of flow of air through a duct, it will be clear that the flow sensor 10 can be adapted for use with other compressible fluids as well, e.g., nitrogen.

Figure 3:
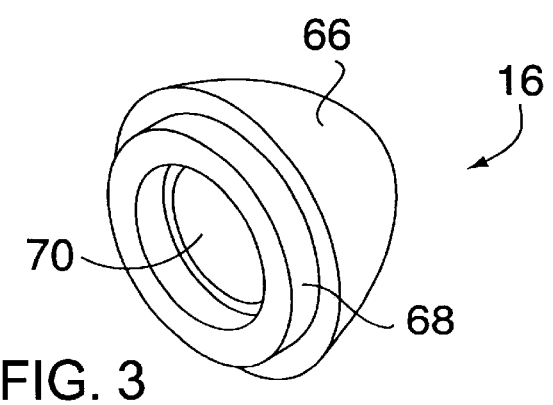
FIG. 3 is perspective view of the nose of the airflow sensor of FIG. 1.

Referring to FIG. 3, the nose 16 of the hub 14 has an outer surface 66 that is substantially elliptical in shape to reduce airflow drag and turbulence. By reducing drag and turbulence, the noise generated by the airflow as it passes by the hub is substantially reduced. Additionally, the measured and published noise levels under ARI Standard 880 are also reduced.

The nose 16 also includes an inwardly stepped rim 68 sized to mate with the total pressure chamber 18 (as shown in FIGS. 1 and 2). A hollow nose interior 70 increases the effective internal volume of the total pressure chamber 18 when the total pressure chamber 18 and the nose 16 are assembled.

Referring to FIGS. 4 and 5, the total pressure chamber 18 is generally elliptical in shape with a smooth outer surface 72, which tapers outwardly from an upstream end portion 74 toward a downstream end portion 76. The upstream portion 74 is generally circular and includes a groove 78 sized to receive the rim 68 of the nose 16. Four wing mounting holes 80 are spaced substantially 90 degrees apart on the outer surface 72 and have a contour which is congruous with wings 24, 26, 28 and 30 to securely receive the wings therein. The mounting holes 80 extend through the outer surface 72 into the hollow total pressure mixing chamber 82 within the total pressure chamber 18. A key way 84 is also disposed in the downstream end of the mixing chamber 82 to insure the proper orientation of the total pressure chamber 18 when assembled to the static pressure chamber 20.

The total pressure profile of the duct is sampled by the spaced holes 32 located on the wings 24, 26, 28 and 30 and fluidly communicated though the internal wing passageway 34 to the mixing chamber 82. The sampled total pressures are combined in the mixing chamber 82 to provide an average total pressure, which is communicated to the controller 58 through the radially extending total pressure port 54.

Figure 6:
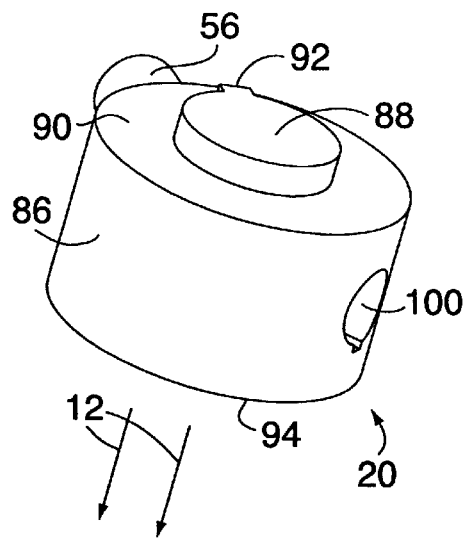
FIG. 6 is perspective view of the static pressure chamber of the airflow sensor of FIG. 1.
Figure 7:
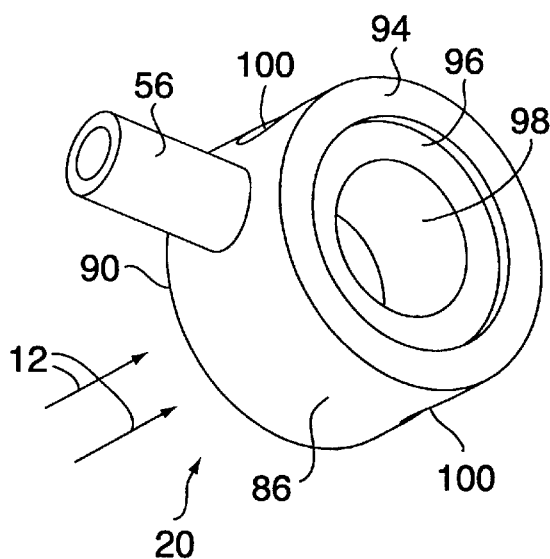
FIG. 7 is perspective view of the static pressure chamber of the airflow sensor of FIG. 1.

Referring to FIGS. 6 and 7, the static pressure chamber 20 is generally cylindrical in shape with a smooth outer surface 86. A raise end cap 88 extends upwardly from the upstream surface 90 of the static pressure chamber 20 and includes a key portion 92 sized to slidably mate with key way 84 of the total pressure chamber 18. The downstream end 94 of the static pressure chamber 20 includes an inwardly stepped rim 96 sized to receive the static chamber cap 22 (as shown in FIGS. 1 and 2), which encloses the hollow interior 98. A pair of static tube mounting holes 100 are spaced substantially 180 degrees apart on the outer surface 86 and have a contour, which is congruous with static tubes 36 and 38 to securely receive the static tubes therein. The mounting holes 100 extend through the outer surface 86 into the hollow interior 98 within the static pressure chamber 20.

The static pressure profile of the duct is sampled at the fluid flow passage 50 extending through the tube wall 40 of the static pressure tubes 36 and 38 and fluidly communicated though the interior tube passageway 52 to the hollow interior 98. The sampled static pressures are combined in the hollow interior 98 to provide an average static pressure, which is communicated to the controller 58 through the radially extending static pressure port 56.

Figure 8:
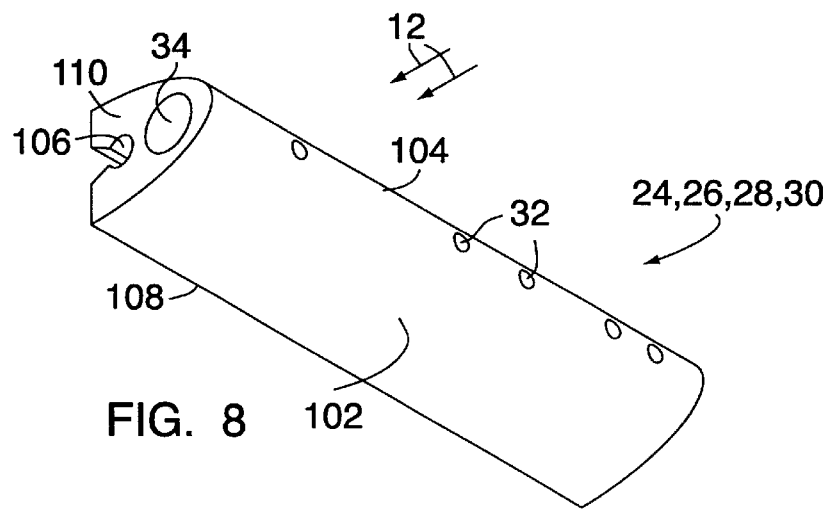
FIG. 8 is perspective view of the wing of the airflow sensor of FIG. 1.

Referring to FIG. 8, the wings 24, 26, 28 and 30 have an outer surface 102 that is substantially elliptical in shape. Like the nose elliptical outer surface 66, the outer surface 102 of the wings reduces air drag, turbulence and therefore noise and pressure drop across the wings. However, though the nose and wings are described in this embodiment as having elliptical outer surfaces, one skilled in the art would recognize that other smooth aerodynamic surface shapes can also be used, e.g., parabolic.

The radially spaced holes 32 are disposed substantially at the upstream apex 104 of the outer surface 102 and extend through the wings 24–30 to the interior wing passageway 34, which communicates with the mixing chamber 82 of the total pressure chamber 18. A mounting groove 106 extends longitudinally along the downstream side 108 of the wings 24–30, and is sized to receive a mounting screw at its outer distal end 110 to securely mount the flow sensor 10 to the inner walls of the duct.

The spaced holes 32 sample the total pressure profile across the traverse of the duct. This is done because velocity in a duct is seldom uniform across any section, and a pitot tube reading indicates velocity at only one location. Therefore a traverse is usually made to determine average velocity. Generally, velocity is lowest near the edges or corners and greatest at or near the center.

As opposed to prior art flow sensors, the radially spaced holes 32 on the wings 24–30 of the flow sensor 10 are substantially spaced per the Log-Tchebycheff rule as defined in ISO Standard 3966, which is herein incorporated by reference. The log-Tchebycheff rule provides the greatest accuracy because its location of traverse points accounts for the effect of wall friction and the fall-off of velocity near the duct walls. For circular ducts, the log-Tchebycheff and log-linear traverse methods are similar. Log-Tchebycheff is now recommended by the American Society of Heating Refrigeration and Air-conditioning Engineers (ASHRAE) for rectangular ducts as well (see page 14.17 of the 1997 ASHRAE Fundamentals Handbook, which is herein incorporated by reference). This Log-Tchebycheff method minimizes the positive error (measured greater than actual) caused by the failure to account for losses at the duct wall. This error can occur when using the older prior art method of equal subareas (or equal concentric areas) to traverse rectangular ducts.

Figure 9:
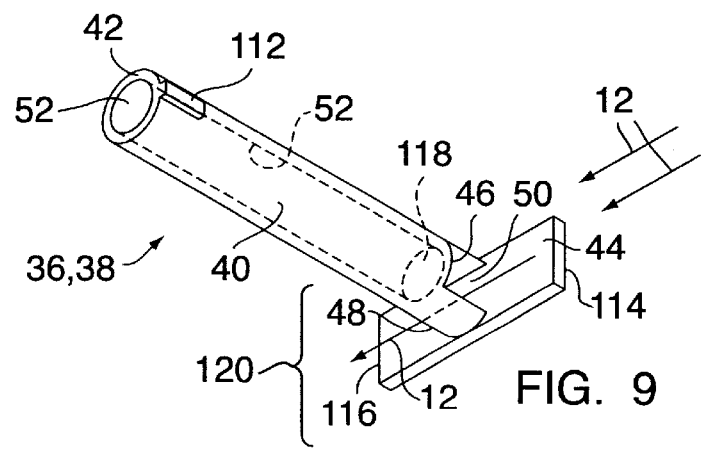
FIG. 9 is perspective view of the static tube of the airflow sensor of FIG. 1.

Referring to FIG. 9, each static tube 36, 38 includes the tube wall 40 extending radially outward from the static pressure chamber 20 of the hub 14 from a first attached end 42 to a second distal closed end 44. The distal closed end 44 has a generally rectangular shape and includes an upstream rim 114 and a downstream rim 116 projecting laterally over opposing sides of the tube wall 40. The generally upstream facing hole 46 and the generally downstream facing hole 48 are disposed on opposing sides of the tube wall 40 to define the fluid flow passage 50 therethrough proximate the second distal end 44. The internal tube passageway 52 connects the flow passage 50 to the static pressure chamber 20. A static tube key 112 disposed on the wall surface 40 at the first attached end 42 insures proper orientation of the static tube 36, 38 when assembled to the mounting holes 100 of the static pressure chamber 20.

As opposed to prior art airflow sensors, the flow passage 50 is sized to provide a vortex effect at the distal end 118 of the internal tube passageway 52. That is as airflows through the flow passage 50, eddy currents are created causing the air static pressure to decrease, i.e., a partial vacuum, in both the internal tube passageway 52 and the hollow interior 98 of the static pressure chamber 20. This partial vacuum increases the differential pressure, i.e., velocity pressure, between the static pressure chamber 20 and the total pressure chamber 18. This resultant increase in the differential pressure has a stabilization effect on the flow rate signal 64 generated by the controller 58, when operating at low airflows.

Though the flow passage 50 is shown in this embodiment as being proximate the closed second distal end 44 of the static tubes 36, 38, it will be clear to one skilled in the art that the flow passage 50 may also be located anywhere along the length of the tube wall 40 intermediate the first attached end 42 and the second distal end 44.

Additionally, for manufacturing purposes, the flow passage may also be an assembled part, such as an end cap, attached to the free radial end portion 120 of the static tube 36, 38. That is the end cap may have the second closed distal end 44 disposed thereon and the fluid flow passage 50 disposed therethrough.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A flow sensor for compressible fluid having a fluid flow from an upstream direction toward a downstream direction, the flow sensor comprising:
 a smoothly contoured central hub having a total pressure chamber and a static pressure chamber disposed therein;
 a pair of wings extending radially outward from opposing sides of the total pressure chamber of the hub, the wings including a plurality of radially spaced holes oriented to generally face the upstream direction and an internal wing passageway connecting the spaced holes to the total pressure chamber; and
 a static tube having,
  a tube wall extending radially outward from the static pressure chamber of the hub from a first attached end to a second distal closed end,
  a generally upstream facing hole and a generally downstream facing hole disposed on opposing sides of the tube wall intermediate the first and second ends to define a fluid flow passage therethrough, and
  an internal tube passageway connecting the flow passage to the static pressure chamber.

2. The flow sensor of claim 1 wherein the flow passage of the static tube is shaped to provide a vortex effect, which reduces static pressure of the fluid within the static pressure chamber relative to static pressure of the fluid external to the static chamber.

3. The flow sensor of claim 1 wherein the radially spaced holes on the wings are substantially spaced per the Log-Tchebycheff rule.

4. The flow sensor of claim 1 wherein the radially spaced holes on the wings are substantially spaced per the Log-linear rule.

5. The flow sensor of claim 1 wherein the wings further comprise a first and second pair of wings extending radially outward from opposing sides of the total pressure chamber of the hub.

6. The flow sensor of claim 5 wherein the static tube further comprises a pair of tubes extending radially outward from opposing sides of the static pressure chamber of the hub.

7. The flow sensor of claim 1 wherein the fluid flow passage of the static tube is disposed proximate the second closed distal end.

8. The flow sensor of claim 1 wherein the wings further include an upstream facing edge having a substantially elliptical shape upon which the radially spaces holes are disposed.

9. The flow sensor of claim 1 wherein the hub further includes an upstream facing nose having a substantially elliptical shape.

10. The flow sensor of claim 1 wherein the compressible fluid further comprises air.

11. The flow sensor of claim 1 wherein the wings further include a distal end adapted to be mounted to a duct.

12. The flow sensor of claim 1 wherein the static tube further includes an end cap mounted to a free radial end portion of the static tube, the end cap having the second closed distal end disposed thereon and the fluid flow passage disposed therethrough.

13. An airflow sensor adapted to be mounted in a duct, the air having a fluid flow from an upstream direction toward a downstream direction, the flow sensor comprising:
 a smoothly contoured central hub having a generally bullet shaped nose facing the upstream direction, the hub including a total pressure chamber and a static pressure chamber disposed therein;
 a first and second pair of wings extending radially outward from opposing sides of the total pressure chamber of the hub, the wings including a plurality of radially spaced holes oriented to generally face the upstream direction and an internal wing passageway connecting the spaced holes to the total pressure chamber; and
 a pair of static tubes each having,
  a tube wall extending radially outward from opposing sides of the static pressure chamber of the hub from a first attached end to a second distal closed end,
  a generally upstream facing hole and a generally downstream facing hole disposed on opposing sides of the tube wall to define a fluid flow passage therethrough proximate the second distal end, and
  an internal tube passageway connecting the flow passage to the static pressure chamber;
 wherein the flow passages of the static tubes are shaped to provide a vortex effect, which reduces static pressure of the fluid within the static pressure chamber relative to static pressure of the fluid external to the static pressure chamber.

14. The flow sensor of claim 13 wherein the radially spaced holes on the wings are substantially spaced per the Log-Tchebycheff rule.

15. The flow sensor of claim 13 wherein the radially spaced holes on the wings are substantially spaced per the Log-linear rule.

16. The flow sensor of claim 13 wherein the wings further include an upstream facing edge having a substantially elliptical shape upon which the radially spaces holes are disposed.

17. The flow sensor of claim 13 wherein nose of the hub further includes a substantially elliptical shape.

18. The flow sensor of claim 13 wherein the static tube further includes an end cap mounted to a free radial end portion of the static tube, the end cap having the second closed distal end disposed thereon and the fluid flow passage disposed therethrough.

* * * * *